United States Patent [19]
Meili

[11] Patent Number: 5,171,407
[45] Date of Patent: Dec. 15, 1992

[54] DISTILLATION PLANT FOR PRODUCING HYDROGEN PEROXIDE

[75] Inventor: Albert Meili, Winterthur, Switzerland

[73] Assignee: Sulzer Brothers Limited, Winterthur, Switzerland

[21] Appl. No.: 570,209

[22] Filed: Aug. 21, 1990

[30] Foreign Application Priority Data

Sep. 22, 1989 [CH] Switzerland ............ 03462/89

[51] Int. Cl.$^5$ ............ B01D 1/00; B01D 3/00
[52] U.S. Cl. ............ 202/153; 159/14; 202/187; 202/189; 202/197; 203/DIG. 4; 423/584
[58] Field of Search ............ 202/153, 197, 189, 185.1, 202/205, 187; 203/DIG. 4, 40, 91; 159/DIG. 41, 14, DIG. 2, 27.1, DIG. 16; 423/584

[56] References Cited

U.S. PATENT DOCUMENTS

| | | | |
|---|---|---|---|
| 2,298,064 | 10/1942 | MacMullin | 423/584 |
| 2,300,985 | 11/1942 | Smith | 159/18 |
| 2,543,001 | 2/1951 | Dean | 202/40 |
| 2,715,607 | 8/1955 | Lee | 202/153 |
| 2,895,886 | 7/1959 | Schneider | 202/153 |
| 3,073,755 | 1/1963 | Bamfield et al. | 203/7 |
| 3,395,157 | 7/1968 | Dankert et al. | 203/41 |
| 3,445,343 | 5/1969 | Popov | 159/18 |
| 3,644,179 | 2/1972 | Knoer et al. | 202/153 |
| 3,755,088 | 8/1973 | Osdor | 159/18 |
| 3,820,582 | 6/1974 | Rönnholm | 159/18 |
| 3,961,658 | 6/1976 | Pagani | 159/18 |
| 4,575,403 | 3/1986 | Rosenhouse et al. | 202/153 |
| 4,695,349 | 9/1987 | Becker et al. | 159/24.3 |

FOREIGN PATENT DOCUMENTS

| | | |
|---|---|---|
| 1025833 | 3/1958 | Fed. Rep. of Germany . |
| 1110143 | 7/1961 | Fed. Rep. of Germany . |
| 1114168 | 9/1961 | Fed. Rep. of Germany . |
| 0563908 | 12/1923 | France . |
| 1121018 | 10/1984 | U.S.S.R. ............ 202/153 |

Primary Examiner—Virginia Manoharan
Attorney, Agent, or Firm—Francis C. Hand

[57] ABSTRACT

A distillation plant is constructed with an evaporator, separator and distillation column integrated together on a common vertical axis so as to eliminate bends and reduced cross sections in the product flow. The distillation column employs a regular packing to further reduce the pressure drop and operating temperatures over the height of the column. The overall pressure drop in the distillation plant is held to a range of less than 20 mbar.

10 Claims, 4 Drawing Sheets

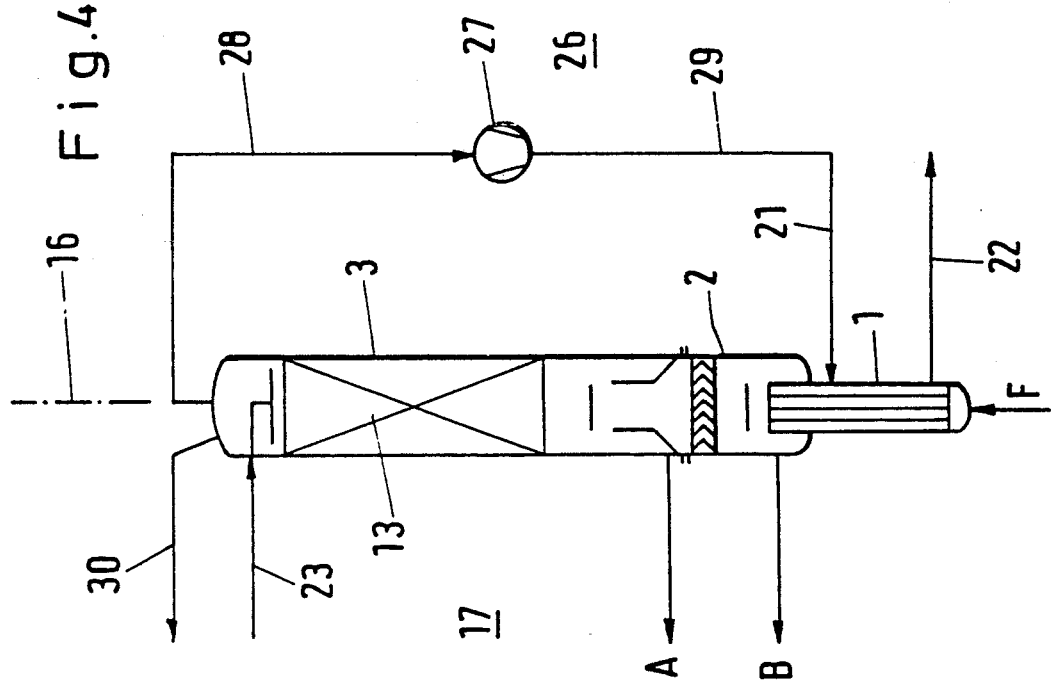
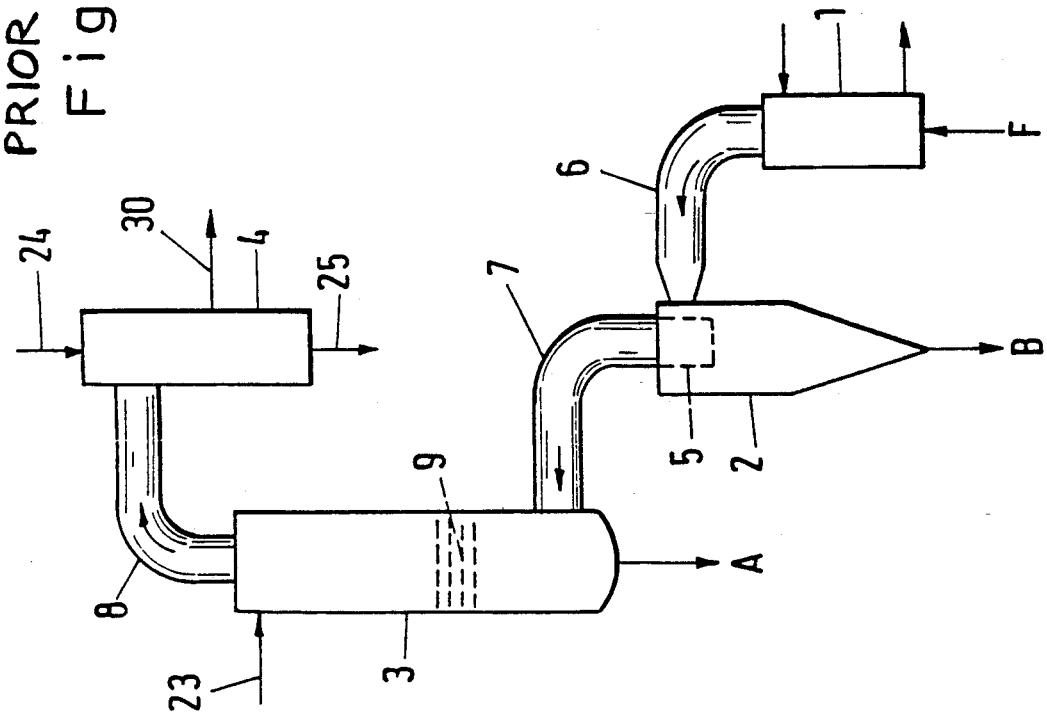

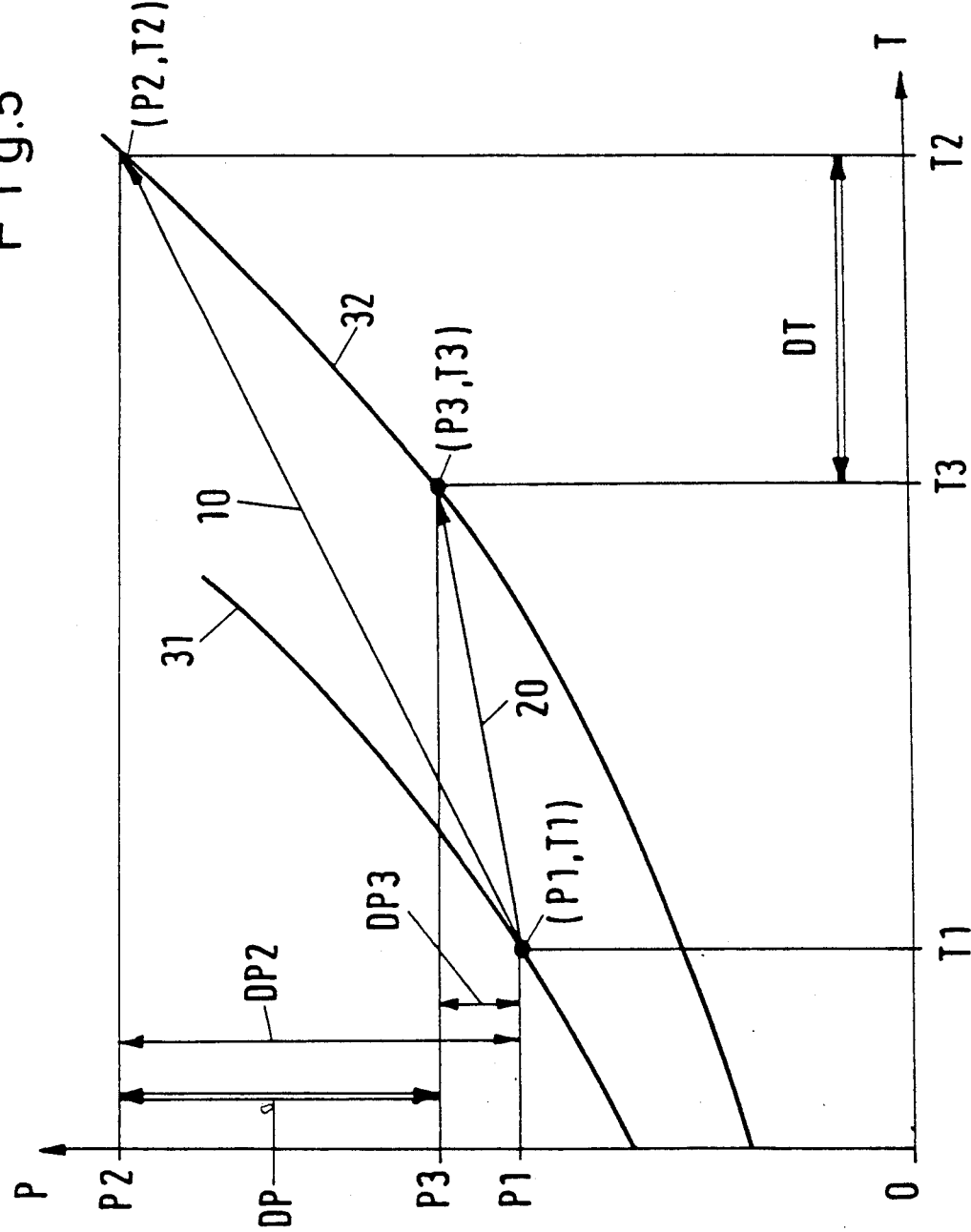

DISTILLATION PLANT FOR PRODUCING HYDROGEN PEROXIDE

This invention relates to a distillation plant for producing hydrogen peroxide. More particularly, this invention relates to a distillation plant for producing concentrated hydrogen peroxide.

As is known, distillation plants for the production of hydrogen peroxide generally have components which include an evaporator, a liquid separator downstream of the evaporator and a distillation column. In addition, these individual components have been connected by curved pipes, for example, as described in U.S. Pat. No. 2,543,001, wherein various components are interconnected by tubes of bent shape and of reduced cross-section. However, the use of curved pipes leads to a relatively high pressure drop over the plant as a whole. This, in turn, necessarily causes a correspondingly large pressure rise in the plant up to the evaporator. In addition, primarily for safety reasons, it has been essential in peroxide production to keep temperatures as low as possible. Accordingly, the distillation plants provided for hydrogen peroxide production have generally been relatively expensive to build while, at the same time, demanding bulky and expensive protective cladding or shielding. In addition, the product content of the plant or product hold up has been undesirably high.

Accordingly, it is an object of the invention to provide a distillation plant with a substantially lower pressure drop and lower operating and maximum temperatures.

It is another object of the invention to improve the safety of a distillation plant during operation.

It is another object of the invention to reduce the product content of a distillation plant was well as the capital cost and space occupied by the plant.

Briefly, the invention provides a distillation plant for producing hydrogen peroxide which is comprised of an evaporator, a separator disposed vertically above the evaporator on a vertical axis and a distillation column having a regular packing disposed above the separator on the same vertical axis.

Because of the compact construction on one axis without connecting ducts, diversions or reductions in cross section, and because the components exhibit a minimal pressure drop, above all in the regular packing in the distillation column, a very low overall pressure drop and, hence, low operating temperatures, are achieved at the same time as substantially lower capital costs and bulk.

The compact construction of the distillation plant and the low pressure drop during operation of the plant, in turn, reduce the product content so that the plant is considerably safer and relatively economical.

The plant may also be provided with a condenser above the column on the same vertical axis. In addition, the condenser may be integrated into a structural unit along with the evaporator, separator and distillation column.

Alternatively, instead of using a condenser, a compressor may be used as a heat pump in order to provide low operating costs.

In order to provide for particularly low pressure drops, the evaporator may be in the form of a riser evaporator the separator may be in the form of a ribbed liquid separator and the condenser may be in the form of a full-counter current mixer condenser. Very good results are obtained with a plant in which the total pressure drop is less than 20 mbar.

These and other objects and advantages of the invention will become more apparent from the following detailed description taken in conjunction with the accompanying drawings.

BRIEF DESCRIPTION OF THE DRAWINGS

FIG. 1 illustrates a schematic view of a known distillation plant;

FIG. 4 illustrates a further modified plant employing a heat pump in accordance with the invention; and FIG. 5 graphically illustrates the operating principle of a distillation plant in accordance with the invention by means of a pressure-temperature (PT) diagram.

DETAILED DESCRIPTION OF THE INVENTION

Figure 2:
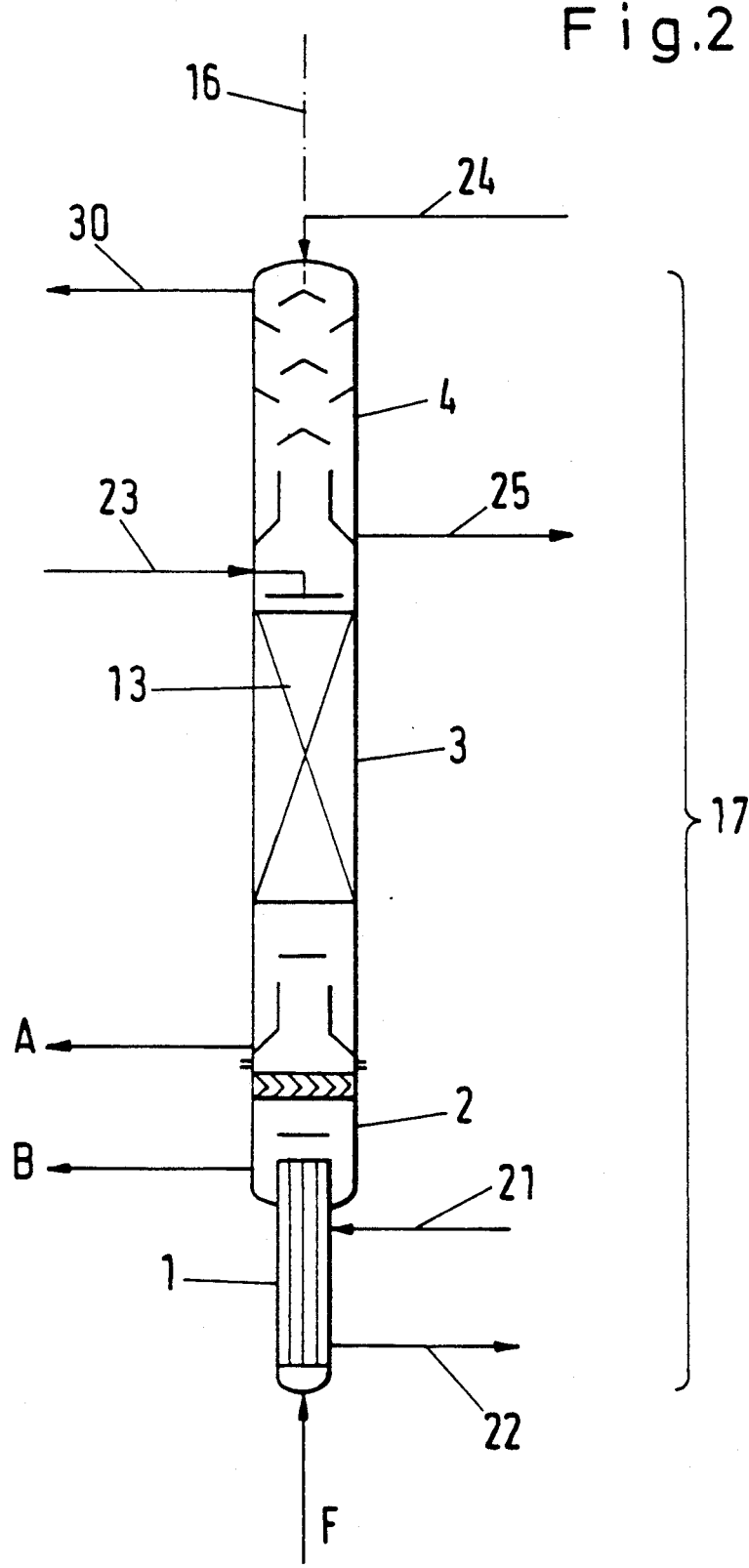
FIG. 2 diagrammatically illustrates a distillation plant constructed in accordance with the invention.

Referring to FIG. 1, the conventional hydrogen peroxide distillation plant includes a feed line F and two product outlet lines A, B of which one outlet line A delivers a pure peroxide solution. For example, the feed into the plant may be 35% while the output through the outlet line A maybe 43% pure solution while the output through the outlet line B may be 53% hydrogen peroxide.

As illustrated, the distillation plant has various individual components including an evaporator 1 in which the incoming feed can be heated and evaporated in a known manner, a separator 2 in which the heated feed is separated into liquid and vapor phases as is known, a distillation column 3 in which the vapor phase is further distilled and a condenser 4 for the condensation of the residual vapor phase. As further indicated, the various components 1, 2, 3, 4 are interconnected by curved connecting ducts 6, 7, 8 in series. As illustrated, the connecting ducts 6, 7, 8 have reduced flow cross sections relative to the respective components 1, 2, 3, 4.

The conventional plant as illustrated in FIG. 1 operates under relatively high pressure drops, partly because of the bends and reductions in cross section in the connecting ducts 6, 7, 8 and, partly in the components. In this latter regard, the separator 2 may be in the form of a cyclone 5 while the distillation column 3 has plates 9.

Referring to FIG. 1, the known plant is also provided with a runback 23 which leads to the distillation column 3 while the condenser 4 has a vacuum connection 30 and intake and discharge lines 24, 25, respectively for cooling water.

Referring to FIG. 2, the distillation plant for producing hydrogen peroxide in accordance with the invention includes an evaporator 1, a separator 2 disposed vertically above the evaporator 1 on a vertical axis 16 and a distillation column 3 having a regular packing 13 disposed above the separator 2 on the vertical axis 16. In addition, a condenser 4 is disposed above the column 3 on the vertical axis 16. As indicated, the four components 1, 2, 3, 4 are arranged in a vertical array directly following one another along the vertical axis 16 and are combined to form one structural unit 17. In this respect, the evaporator 1 is built directly onto the separator 2 which forms an extension of the distillation column 3.

As indicated, the evaporator 1 is provided with a vapor intake 21 and a condensate discharge line 22 as well as feed line F for the input of feed. A runback 23 is also provided above the packing 13 of the distillation column 3 for the distribution of a liquid phase of the product over the packing 13.

The condenser 4 is also provided with intake and discharge lines 24, 25 respectively for cooling water or the like. In addition, a vacuum connection 30 is provided as is known.

As illustrated, the separator 2 has a product outlet B while the bottom of the distillation column 3 is provided with a product outlet A.

Figure 3:
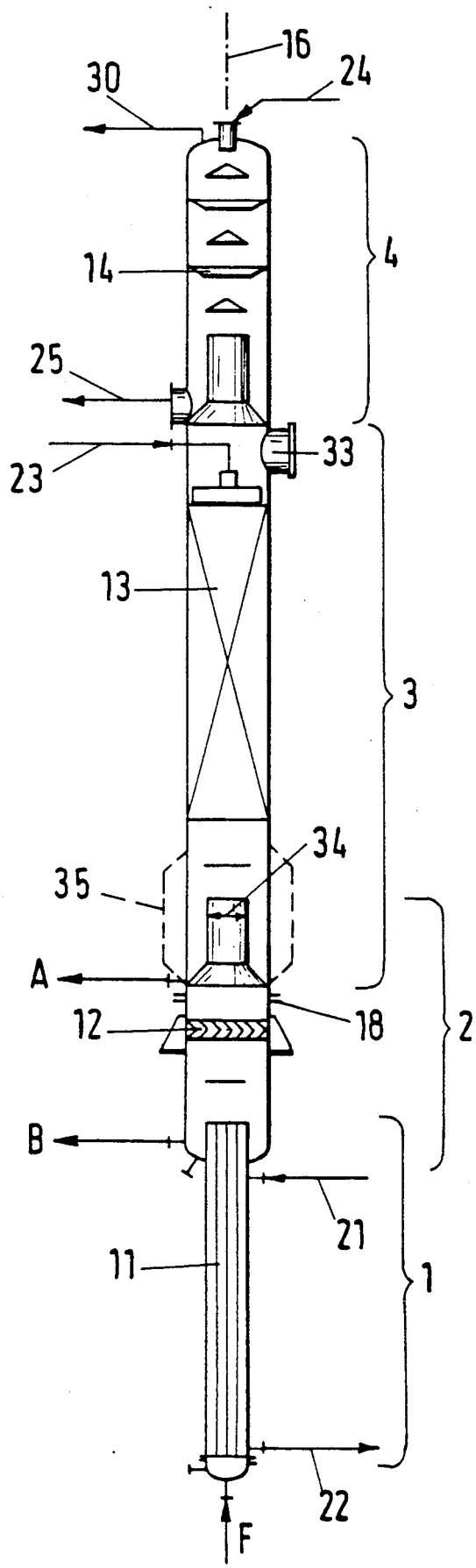
FIG. 3 illustrates a modified view of a distillation plant constructed in accordance with the invention.

Referring to FIG. 3, wherein like reference character like parts as above, the components 1-4 of the distillation are chosen for their low flow resistance and pressure drop. For example, the evaporator 1 may be in the form of a riser evaporator 1; the separator 2 may include a ribbed liquid separator 12, the regular column packing 13 may well have a large surface area, for example, utilizing a Sulzer packing, a Mellapak ® packing or the like; the condenser 4 may be in the form of a full-counter current mixer condenser 14. In order to simplify assembly, the structural unit may be made in two parts which are joined together with a single flange 18. This allows the sealing problems found with conventional plants having a number of connections such as illustrated in FIG. 1 to be eliminated. Alternatively, the unit 17 may be made without a flange 18, for example in the form of a one-piece welded structural unit 17, for example with a manhole 33 for inspection. Preferably, the plant is made either entirely of high-grade aluminum or of stainless steel.

In order to improve the flow in the plant, the flow cross section 34 in the lower part of the column 3 may be increased while, at the same time, the wall of the column 3 is provided with a widening 35.

Referring to FIG. 4, the distillation plant may be constructed with a heat pump 26 rather than a condenser as in FIGS. 2 and 3. In this case, the heat pump 26 is in the form of a compressor 27, for example, a single- or two-stage radial compressor which is connected by lines 28, 29 to the distillation column 3 and evaporator 1, respectively. During operation, the compressor 27 compresses the vapors from the head of the column 3 to an increased pressure and temperature (PT) value to the extent that this suffices to heat the evaporator 1. As indicated, the compressed vapors are directed to the evaporator 1 via the line 29 and the vapor intake 21 to the evaporator 1. Only the vertical arrangement of the distillation of plant components 1, 2, 3 with the very low pressure loss permits an economic use of a heat pump in this way. In addition, the use of the heat pump permits a further clear reduction in operating costs.

FIG. 5 illustrates by means of a pressure-temperature (PT) diagram the improvement which can be achieved with a plant (20) constructed, for example, in accordance with FIG. 2, as compared with a conventional plant (10) as constructed in accordance with FIG. 1. One curve 31 represents a vapor/pressure curve of water while a second curve 32 represents the vapor/pressure curve of a hydrogen peroxide ($H_2O_2$) solution of constant concentration, e.g. 53%. The point (P1, T1) with the pressure P1 and temperature T1 indicates the head values in the condenser (or, in the case of FIG. 4, the distillation column). The pressure and temperature increase along the flow path of each plant as indicated The relatively high maxima of the conventional plant are designated as P2, T2. On the other hand, the distillation plant in accordance with the invention, has a much lower maxima P3, T3, to obtain the same concentration of $H_2O_2$.

As indicated, the conventional plant has a rather large pressure drop DP2 between the points P2 and P1. On the other hand, the pressure drop DP3 of a plant in accordance with the invention has a fraction of that of the conventional plant, i.e. being between the points P3 and P1.

The resulting reductions in temperature DT and in pressure drop DP represent correspondingly massive improvements in plant safety and economy.

Based on head values P1=60 mbar and T1=36° C., the values for a conventional plant amount, for example, to T2=60° C.; P2=120 mbar with a pressure difference DP2 of 60 mbar.

With a plant constructed in accordance with the invention, it is possible to achieve the following values P3=72 mbar, T3=50° C. and consequently, a pressure difference DP3 of 12 mbar. The reduction in the pressure drop DP achieved by the distillation plant in accordance with the invention therefor amounts to 48 mbar with a temperature reduction DT=10° C.

The distillation plants described in FIGS. 2, 3 and 4 have components which function in the same manner as in previously known distillation columns such as illustrated in FIG. 1. Hence, the specific function and structure of each evaporator, separator, distillation column and condenser are not further described.

During operation, for example in the distillation column described in FIG. 2, the flow from the evaporator 1 is directed into the condenser 2 axially of the vertical axis 16. Thereafter, the flow of the condenser 2 is directed vertically upwardly coaxially of the vertical axis 16 into the distillation column 3 and, thus, the packing 13. Upon exiting the distillation column 3, the flow travels upwardly directly into the condenser 4 on the vertical axis 16. Thus, without the interposition of bends, the pressure drop in the flow between each component 1-4 is substantially eliminated.

The invention thus provides a distillation plant which is able to operate at a greatly reduced pressure drop and under reduced operating temperatures.

In addition, the invention provides a distillation plant which can be constructed and operated in an economical manner for the production of hydrogen peroxide.

Further, the invention provides a distillation which is of relatively compact construction while at the same time maximizing safety due to the operating pressures and temperatures being relatively low.

What is claimed is:

1. A distillation plant for producing hydrogen peroxide comprising
    an evaporator;
    a separator disposed vertically above said evaporator on a vertical axis;
    a distillation column having a regular packing disposed above said separator on said axis and defining a single structural unit with said evaporator and said separator and;
    a condenser above said column on said vertical axis.

2. A distillation plant as set forth in claim 1 wherein said condenser is a counter-current mixer condenser.

3. A distillation plant as set forth in claim 1 wherein said evaporator is a riser evaporator.

4. A distillation plant as set forth in claim 1 wherein said separator is a ribbed liquid separator.

5. A distillation plant as set forth in claim 1 wherein said structural unit effects a total pressure drop of a flow vertically through said evaporator, separator and distillation column of less than 20 mbar.

6. A distillation plant for producing concentrated hydrogen peroxide comprising an evaporator having a low flow resistance for evaporating a flow of hydrogen peroxide solution passing therethrough;

a low flow resistance separator directly connected to and above said evaporator on a common vertical axis to receive a flow of vaporized solution therefrom for separation into a liquid phase and a vapor phase; and a distillation column connected to and disposed above said separator on said axis to receive a flow of the vapor phase therefrom, said column defining a single structural unit with said evaporator and said separator and having a regular packing therein of low flow resistance and low pressure drop.

7. A distillation plant as set forth in claim 6 which further comprises a condenser above said column on said vertical axis.

8. A distillation plant as set forth in claim 6 which further comprises a heat pump connected between and to a head of said distillation column and said evaporator for compressing a flow passing from said column to said evaporator.

9. A distillation plant as set forth in claim 6 wherein said structural unit is characterized in effecting total pressure drop of a flow vertically through said evaporator, separator and distillation column of less than 20 mbar.

10. A distillation plant for producing hydrogen peroxide comprising an evaporator;

a separator disposed vertically above said evaporator on a vertical axis;

a distillation column having a regular packing disposed above said separator on said axis and defining a single structural unit with said evaporator and said separator; and a heat pump connected between and to a head of said distillation column and said evaporator for compressing a flow passing from said column to said evaporator.

* * * * *